(12) United States Patent
Heinze et al.

(10) Patent No.: US 11,237,830 B2
(45) Date of Patent: Feb. 1, 2022

(54) MULTI-MAGNITUDINAL VECTORS WITH RESOLUTION BASED ON SOURCE VECTOR FEATURES

(71) Applicant: A-LIFE MEDICAL, LLC, San Diego, CA (US)

(72) Inventors: Daniel T. Heinze, San Diego, CA (US); Mark L. Morsch, San Diego, CA (US)

(73) Assignee: Optum360, LLC, Eden Prairie, MN (US)

( * ) Notice: Subject to any disclaimer, the term of this patent is extended or adjusted under 35 U.S.C. 154(b) by 862 days.

(21) Appl. No.: 16/003,619

(22) Filed: Jun. 8, 2018

(65) Prior Publication Data

US 2018/0293071 A1    Oct. 11, 2018

Related U.S. Application Data

(63) Continuation of application No. 14/154,527, filed on Jan. 14, 2014, now Pat. No. 10,019,261, which is a continuation of application No. 11/735,264, filed on Apr. 13, 2007, now Pat. No. 8,682,823.

(51) Int. Cl.
*G06F 9/30* (2018.01)
*G06F 16/33* (2019.01)
*G06F 40/30* (2020.01)

(52) U.S. Cl.
CPC ...... *G06F 9/30036* (2013.01); *G06F 16/3347* (2019.01); *G06F 40/30* (2020.01)

(58) Field of Classification Search
CPC ... G06F 9/30036; G06F 16/3347; G06F 40/30
See application file for complete search history.

(56) References Cited

U.S. PATENT DOCUMENTS

| | | |
|---|---|---|
| 3,996,672 A | 12/1976 | Osofsky et al. |
| 5,307,262 A | 4/1994 | Ertel |
| 5,325,293 A | 6/1994 | Dorne |
| 5,483,443 A | 1/1996 | Milstein et al. |
| 5,583,758 A | 12/1996 | McIlroy et al. |
| 5,594,638 A | 1/1997 | Iliff |

(Continued)

OTHER PUBLICATIONS

Corley, et al., "Measuring the Semantic Similarity of Texts", ACM 2005, pp. 13-18 (Year: 2005).

(Continued)

*Primary Examiner* — Paulinho E Smith
(74) *Attorney, Agent, or Firm* — Dorsey & Whitney LLP

(57) ABSTRACT

Methods, systems and computer program products for resolving multiple magnitudes assigned to a target vector are disclosed. A target vector that includes one or more target vector dimensions is received. One of the target vector dimensions is processed to determine a total number of magnitudes assigned to the processed target vector dimension. Also, a source vector that includes one or more source vector dimensions is received. The received source vector is processed to determine a total number of features associated with the source vector. When it is detected that the total number of magnitudes assigned to the processed target vector dimension exceeds one, one of the assigned magnitudes is selected based on one of the determined features associated with the source vector.

16 Claims, 6 Drawing Sheets

(56) References Cited

U.S. PATENT DOCUMENTS

| | | |
|---|---|---|
| 5,619,709 A | 4/1997 | Caid et al. |
| 5,675,819 A | 10/1997 | Schuetze |
| 5,680,511 A | 10/1997 | Baker et al. |
| 5,778,157 A | 7/1998 | Oatman et al. |
| 5,794,178 A | 8/1998 | Caid et al. |
| 5,809,476 A | 9/1998 | Ryan |
| 5,873,056 A | 2/1999 | Liddy et al. |
| 5,900,871 A | 5/1999 | Atkin et al. |
| 5,941,820 A | 8/1999 | Zimmerman |
| 5,963,894 A | 10/1999 | Richardson et al. |
| 5,995,955 A | 11/1999 | Oatman et al. |
| 6,049,390 A | 4/2000 | Notredame et al. |
| 6,055,494 A | 4/2000 | Friedman |
| 6,081,774 A | 6/2000 | de Hita et al. |
| 6,137,911 A | 10/2000 | Zhilyaev |
| 6,182,029 B1 | 1/2001 | Friedman |
| 6,389,405 B1 | 5/2002 | Oatman et al. |
| 6,498,982 B2 | 12/2002 | Bellesfield et al. |
| 6,522,939 B1 | 2/2003 | Strauch et al. |
| 6,529,876 B1 | 3/2003 | Dart et al. |
| H2098 H | 3/2004 | Morin |
| 6,708,186 B1 | 3/2004 | Claborn et al. |
| 6,866,510 B2 | 3/2005 | Polanyi et al. |
| 6,915,254 B1 * | 7/2005 | Heinze .................. G06F 40/20 704/9 |
| 6,980,875 B1 | 12/2005 | Stromberg |
| 7,043,426 B2 | 5/2006 | Roberge et al. |
| 7,113,905 B2 | 9/2006 | Parkinson et al. |
| 7,174,507 B2 | 2/2007 | Baudin et al. |
| 7,359,861 B2 | 4/2008 | Lee |
| 7,360,151 B1 | 4/2008 | Froloff |
| 7,369,998 B2 | 5/2008 | Sarich et al. |
| 7,401,077 B2 | 7/2008 | Bobrow et al. |
| 7,493,326 B2 | 2/2009 | Bishop et al. |
| 7,516,125 B2 | 4/2009 | Rao et al. |
| 7,610,190 B2 | 10/2009 | Polanyi et al. |
| 7,624,027 B1 | 11/2009 | Stern et al. |
| 7,653,641 B2 | 1/2010 | Theissen et al. |
| 7,720,723 B2 | 5/2010 | Dicker et al. |
| 7,827,165 B2 | 11/2010 | Abernethy et al. |
| 7,865,358 B2 | 1/2011 | Green et al. |
| 7,908,552 B2 | 3/2011 | Heinze |
| 7,949,538 B2 | 5/2011 | Heinze |
| 8,078,454 B2 | 12/2011 | Pouzin |
| 8,140,323 B2 | 3/2012 | Johnson et al. |
| 8,438,496 B1 | 5/2013 | Hegde |
| 8,655,668 B2 * | 2/2014 | Heinze .................. G06F 40/40 704/277 |
| 8,682,823 B2 * | 3/2014 | Heinze ................ G06F 9/30036 706/45 |
| 8,719,703 B2 | 5/2014 | Bier |
| 8,731,954 B2 | 5/2014 | Heinze et al. |
| 9,110,756 B1 | 8/2015 | Guo et al. |
| 9,804,772 B2 | 10/2017 | Oh et al. |
| 10,216,901 B2 | 2/2019 | Heinze et al. |
| 2002/0010714 A1 | 1/2002 | Hetherington |
| 2002/0035581 A1 | 3/2002 | Reynar et al. |
| 2002/0040359 A1 | 4/2002 | Green et al. |
| 2002/0085040 A1 | 7/2002 | Krolczyk et al. |
| 2002/0128819 A1 | 9/2002 | Jessee et al. |
| 2002/0156810 A1 | 10/2002 | Holland et al. |
| 2003/0018251 A1 | 1/2003 | Solomon |
| 2003/0033347 A1 | 2/2003 | Bolle et al. |
| 2003/0074222 A1 | 4/2003 | Rosow et al. |
| 2003/0115039 A1 | 6/2003 | Wang |
| 2003/0115195 A1 | 6/2003 | Fogel et al. |
| 2003/0217052 A1 | 11/2003 | Rubenczyk et al. |
| 2004/0059577 A1 | 3/2004 | Pickering |
| 2004/0064808 A1 | 4/2004 | Kira |
| 2004/0093293 A1 | 5/2004 | Cheung |
| 2004/0117734 A1 | 6/2004 | Krickhahn |
| 2004/0172297 A1 | 9/2004 | Rao et al. |
| 2004/0249638 A1 | 12/2004 | Wang |
| 2004/0254816 A1 | 12/2004 | Myers |
| 2005/0010421 A1 | 1/2005 | Watanabe et al. |
| 2005/0071185 A1 | 3/2005 | Thompson |
| 2005/0091067 A1 | 4/2005 | Johnson |
| 2005/0261910 A1 | 11/2005 | Percoda et al. |
| 2005/0273361 A1 | 12/2005 | Busch |
| 2006/0000257 A1 | 1/2006 | Samadpour et al. |
| 2006/0059021 A1 | 3/2006 | Yulman et al. |
| 2006/0129922 A1 | 6/2006 | Walker |
| 2006/0134750 A1 | 6/2006 | Liu et al. |
| 2006/0149565 A1 | 7/2006 | Riley |
| 2006/0247949 A1 | 11/2006 | Shorrosh |
| 2007/0061348 A1 | 3/2007 | Holland et al. |
| 2007/0094030 A1 | 4/2007 | Xu |
| 2007/0226211 A1 | 9/2007 | Heinze et al. |
| 2007/0237377 A1 | 10/2007 | Oosawa |
| 2007/0294200 A1 | 12/2007 | Au |
| 2008/0004505 A1 | 1/2008 | Kapit et al. |
| 2008/0033759 A1 | 2/2008 | Finlay |
| 2008/0222518 A1 | 9/2008 | Walker |
| 2008/0256108 A1 | 10/2008 | Heinze et al. |
| 2008/0256329 A1 * | 10/2008 | Heinze ................ G06F 16/3347 712/4 |
| 2008/0282153 A1 | 11/2008 | Kindeberg et al. |
| 2009/0055477 A1 | 2/2009 | Flesher et al. |
| 2009/0070140 A1 | 3/2009 | Morsch et al. |
| 2009/0144617 A1 | 6/2009 | Funes et al. |
| 2009/0175550 A1 | 7/2009 | Taleb |
| 2010/0064131 A1 | 3/2010 | Spatscheck et al. |
| 2010/0070517 A1 | 3/2010 | Ghosh et al. |
| 2010/0082673 A1 | 4/2010 | Nakano et al. |
| 2010/0195909 A1 | 8/2010 | Wasson et al. |
| 2010/0257444 A1 | 10/2010 | Bever et al. |
| 2011/0093479 A1 | 4/2011 | Fuchs |
| 2012/0011084 A1 | 1/2012 | Gulwani et al. |
| 2012/0011470 A1 | 1/2012 | Oh et al. |
| 2012/0136863 A1 | 5/2012 | Bobick et al. |
| 2013/0103615 A1 | 4/2013 | Mun |
| 2013/0124536 A1 * | 5/2013 | Miyahara ............ G06F 16/9535 707/748 |
| 2013/0212508 A1 | 8/2013 | Barsoum et al. |
| 2013/0246480 A1 | 9/2013 | Lemcke et al. |
| 2013/0262125 A1 | 10/2013 | Tunstall-Pedoe |
| 2014/0052712 A1 * | 2/2014 | Savage ................ G06F 16/248 707/722 |
| 2014/0074797 A1 | 3/2014 | Mcfarland |
| 2014/0074867 A1 | 3/2014 | Mcfarland |
| 2014/0164388 A1 | 6/2014 | Zhang et al. |
| 2017/0046425 A1 | 2/2017 | Tonkin et al. |
| 2018/0197261 A1 | 7/2018 | Morsch et al. |
| 2018/0341636 A1 | 11/2018 | Heinze et al. |
| 2019/0156939 A1 | 5/2019 | Heinze et al. |
| 2019/0377797 A1 * | 12/2019 | Liu .................. G06F 40/30 |
| 2020/0380210 A1 * | 12/2020 | Liu .................. G06F 40/295 |
| 2021/0049481 A1 * | 2/2021 | Robinson ................ G06N 5/04 |

OTHER PUBLICATIONS

"DHHS: Rat-Stats Companion Manual", Department of Health and Human Services—OIG Office of Audit Services. Rat-Stats Companion Manual, Sep. 2011. (56 pages).

"DHHS: Rat-Stats User Guide", Department of Health and Human Services—OIG Office of Audit Services. Rat-Stats User Guide, Sep. 2011. (108 pages).

"HL7 Clinical Document Architecture, Release 2.0", "HL7 Clinical Document Architecture, Release 2.0" (online) [Retrieved Dec. 20, 2010]; Retrieved from the Internet URL: www.hl7.org/v3ballot/html/foundationdocuments/cda/cda.htm. (190 pages).

"Introducing SNOMED CT", "Introducing SNOMED CT" (online) [Retrieved Dec. 21, 2010]; Retrieved from the Internet URL: www.ihtsdo.org/publications/introducing-snomed-ct/. (2 pages).

"SNOMED Clinical Terms Basics", "SNOMED Clinical Terms Basics" (online) [Retrieved Dec. 21, 2010]; retrieved from the Internet URL: www.ihtsdo.org/fileadmin/user_upload/Docs_01/Recourses/Introducing_SNOMED_CT/SNOMED_CT_Basics_IHTSDO_Taping_Aug08.pdf. (82 pages).

"SNOMED Clinical Terms Fundamentals", "SNOMED Clinical Terms Fundamentals" (online) [Retrieved Dec. 21, 2010]; retrieved

(56) References Cited

OTHER PUBLICATIONS from the Internet URL: www.ihtsdo.org/fileadmin/user_upload/docs_01/SNOMED_Clinical_Terms_Fundamentals.pdf. (56 pages).
"SNOMED Clinical Terms Overview", "SNOMED Clinical Terms Overview" (online) [Retrieved Dec. 21, 2010]; retrieved from the Internet URL: www.ihtsdo.org/fileadmin/user_upload/Docs_01/Recourses/Introducing_SNOMED_CT/SNOMED_CT_Overview)_IHTSDO_Taping_Aug08.pdf. (80 pages).
"SNOMED Clinical Terms User Guide Jan. 2010 International Release (US English)", "SNOMED Clinical Terms User Guide Jan. 2010 International Release (US English)" (online) [Retrieved Dec. 21, 2010]; Retrieved from the Internet URL: www.ihtsdo.org/fileadmin/user_upload/Docs_01/Publications/doc_userguide_current-en-US_INT_20100131.pdf.
"SNOMED CT Browsers", "SNOMED CT Browsers" (online) [Retrieved Dec. 21, 2010]; Retrieved from the Internet URL: www.nim.nih.gov/research/umls/Snomed/snomed_browsers.html. (2 pages).
"Value Proposition for SNOMED CT", "Value Proposition for SNOMED CT" (online) [Retrieved Dec. 21, 2010]; Retrieved from the Internet URL: www.ihtsdo.org/fileadmin/user_upload/Docs_01/Publications/SNOMED_CT/SNOMED_CT_Benefits_v4.pdf. (3 pages).
Aronow, et al., "A PC Classifier of Clinical Text Documents: Advanced Information Retrieval Technology Transfer", "A PC Classifier of Clinical Text Documents: Advanced Information Retrieval Technology Transfer", Journal of the American Medical Informatics Association, 1996, Amherst, MA. (1 page).
Aronow, et al., "Ad-Hoc Classification of Electronic Clinical Documents", "Ad-Hoc Classification of Electronic Clinical Documents", D-Lib Magazine, Jan. 1997, Amherst, MA. (10 pages).
Aronow, et al., "Automated Classification of Encounter Notes in a Computer Based Medical Record", "Automated Classification of Encounter Notes in a Computer Based Medical Record", Amherst, MA. (5 pages).
Aronow, et al., "Automated Identification of Episodes of Asthma Exacerbation for Quality Measurement in a Computer-Based Medical Record", "Automated Identification of Episodes of Asthma Exacerbation for Quality Measurement in a Computer-Based Medical Record", Brookline, MA and Amherst, MA. (5 pages).
Brigitte, Jorg et al., "Modeling the semantics of contextual and content-specific research metadata using ontology languages: issues on combining CERIF and OWL", Jorg et al., Modeling the Semantics of Contextual and Content-Specific Research Metadata Using Ontology Languages: Issues on Combining CERIF and OWL, Elsevier 2012, pp. 1563-1570.
Croft, et al., "Effective Access to Distributed Heterogeneous Medical Text Databases", "Effective Access to Distributed Heterogeneous Medical Text Databases", 1995, Amherst, MA. (1 page).
Friedman, et al., "Natural Language Processing in an Operational Clinical Information System", "Natural Language Processing in an Operational Clinical Information System", Natural Language Engineering, vol. 1, May 1995, pp. 83-108. (26 pages).
Furuse, et al., "Constituent Boundary Parsing for Example-Based Machine Translation", "Constituent Boundary Parsing for Example-Based Machine Translation", Google 1994, pp. 105-111. (7 pages).
Gregory, Tom, "Interpreting Error Rates in Health Care Billing Audits", "Interpreting Error Rates in Health Care Billing Audits," Journal of Health Care Compliance; Jan./Feb. 2003; 5,1; p. 4-8. (5 pages).
Hirsch, et al., "Suggesting Terms for Query Expansion in a Medical Information Retrieval System", "Suggesting Terms for Query Expansion in a Medical Information Retrieval System", AMIA Annual Symposium on Computer Application in Medical Care, 1995, p. 965. (1 page).
Larkey, et al., "Automatic Assignment of ICD9 Codes to Discharge Summaries", "Automatic Assignment of ICD9 Codes to Discharge Summaries" Amherst, MA. (24 pages).
Lehnert, et al., "Inductive Text Classification for Medical Appointments", "Inductive Text Classification for Medical Appointments", Journal for Experimental and Theoretical Artificial Intelligence 7(1), pp. 271-302, 1995. (39 pages).
Lenert, et al., "Automated Linkage of Free-text Descriptions of Patients with a Practice Guideline", "Automated Linkage of Free-text Descriptions of Patients with a Practice Guideline" 17.sup.th Annual Symposium on Computer Application in Medical Care, pp. 274-278, 1993, Stanford, CA. (6 pages).
Neubauer, Aljoscha S., "The EWMA Control Chart", "The EWMA Control Chart", Clinical Chemistry, 43:4, pp. 594-601, 1997. (8 pages).
Ranum, David L., "Knowledge Based Understanding of Radiology Text", "Knowledge Based Understanding of Radiology Text" 12.sup.th Annual Symposium on Computer Application in Medical Care, pp. 141-145, 1988, Rochester, MN. (6 pages).
Richardson, S. et al., "MindNet: acquiring and structuring semantic information from text", ACM 1998, pp. 1098-1102. (5 pages).
Sager, et al., "Automated Encoding into SNOMED III: A Preliminary Investigation", "Automated Encoding into SNOMED III: A Preliminary Investigation", 18.sup.th Annual Symposium on Computer Application in Medical Care, pp. 230-234, 1994, New York, NY. (5 pages).
Sager, et al., "Natural Language Processing and the Representation of Clinical Data", "Natural Language Processing and the Representation of Clinical Data", Journal of American Medical Information Association, vol. 2, pp. 142-160, Mar./Apr. 1994, New York, NY. (19 pages).
Shaikh, et al., "Assessing Sentiment of Text by Semantic Dependency and Contextual Valence Analysis", "Assessing Sentiment of Text by Semantic Dependency and Contextual Valence Analysis", Springer 2007, pp. 191-202. (12 pages).
Sneideman, et al., "Finding the Findings: Identification of Findings in Medical Literature Using Restricted Natural Language Processing", "Finding the Findings: Identification of Findings in Medical Literature Using Restricted Natural Language Processing", National Library of Medicine, Bethesda, MD 1996, pp. 239-243. (5 pages).
Soderland, et al., "Machine Learning of Text Analysis Rules for Clinical Records", "Machine Learning of Text Analysis Rules for Clinical Records" Amherst, MA and Brookline, MA. (5 pages).
Starosta, et al., "Lexicase Parsing: A Lexicon-Driven Approach to Syntactic Analysis", "Lexicase Parsing: A Lexicon-Driven Approach to Syntactic Analysis", Google 1986, pp. 127.132. (6 pages).
Stoica, Emilia et al., "Newarly-Automated Metadata Hierarchy Creation", Stoica et al., Nearly-Automated Metadata Hierarchy Creation, ACM 2004, pp. 1-4.
Wattenberg, et al., Wattenberg et al., The Word Tree, an Interactive Visual Concordance, IEEE 2008, pp. 1221-1228.
Yang, et al., "An Application of Least Squares Fit Mapping to Clinical Classification", "An Application of Least Squares Fit Mapping to Clinical Classification", 16.sup.th Annual Symposium of Computer Application in Medical Care, pp. 460-464, 1993, Rochester, MN. (5 pages).
Zhou, X. et al., "Converting Semi-structured Clinical Medical Records into Information and Knowledge", IEEE 2005, pp. 1-8. (8 pages).
Zingmond, et al., "Monitoring Free-Text Data Using Medical Language Processing", "Monitoring Free-Text Data Using Medical Language Processing", Computers and Biomedical Research 26, pp. 467-481, 1993, Standford, CA. (8 pages).
Giunchiglia, Fausto, "Approximate Structure-Preserving Semantic Matching", Springer 2008, pp. 1217-1234. (Year: 2008).
Varelas, Giannis et al., "Semantic Similarity Methods in WordNet and their Application to Information Retrieval on the Web", ACM 2005, pp. 10-16. (Year: 2005).
Hunt et al., "Extensible Language-Aware Merging", The Computer Society, Proceedings of the International Conference on Software Maintenance, 2002, 10 pages, IEEE.

* cited by examiner

MULTI-MAGNITUDINAL VECTORS WITH RESOLUTION BASED ON SOURCE VECTOR FEATURES

CROSS-REFERENCE TO RELATED APPLICATION

This application is a continuation application of U.S. patent application Ser. No. 14/154,527 filed Jan. 14, 2014, issued as U.S. Pat. No. 10,019,261 on Jul. 10, 2018, which is a continuation of U.S. patent application Ser. No. 11/735,264 filed Apr. 13, 2007, issued as U.S. Pat. No. 8,682,823 on Mar. 25, 2014, the contents of all of which are incorporated herein by reference, in their entirety, for any purpose.

TECHNICAL FIELD

The following disclosure relates to techniques for performing vector comparisons in which a multi-magnitudinal target vector is resolved to a single-magnitude source vector based on one or more features of the single-magnitude source vector.

BACKGROUND

In natural language processing (NLP), input text data can be processed to obtain a list of parse items that may or may not represent known terms and phrases. Some parse items are associated with modifiers or attributes that tend to describe certainty or temporality of a word being modified. In medical coding, parse items tend to represent medical conditions with the attributes providing appropriate modifications. Such parse items can be compared against known vectors that represent descriptions of diagnoses and medical procedures to assign appropriate medical codes to the input text data (e.g., physician notes.)

SUMMARY OF THE INVENTION

Techniques for implementing multi-magnitudinal vector comparisons are disclosed.

In one aspect, resolving multiple magnitudes assigned to a target vector includes receiving a target vector that includes one or more target vector dimensions. One of the target vector dimensions is processed to determine a total number of magnitudes assigned to the processed target vector dimension. Also, a source vector that includes one or more source vector dimensions is received. The received source vector is processed to determine a total number of features associated with the source vector. When it is detected that the total number of magnitudes assigned to the processed target vector dimension exceeds one, one of the assigned magnitudes is selected based on one of the detected features associated with the source vector.

Implementations can optionally include one or more of the following features. The target vector can be compared with the source vector to obtain a similarity measure. In addition, when it is detected that the total number of magnitudes assigned to the processed target vector dimension equals one, the one assigned magnitude can be selected. Selecting one of the assigned magnitudes based on one of the detected features can include selecting one of the assigned magnitudes based on a magnitude associated with the detected feature. Further, selecting one of the assigned magnitudes based on one of the determined features can include selecting one of the assigned magnitudes based on a detection of at least one from a group including (1) a morphological characteristic of one or more of the source vector dimensions; (2) a syntactic characteristic of one or more of the source vector dimensions; (3) proximity of one of the source vector dimensions to other dimensions in the source vector; (4) proximity of one of the source vector dimensions to other dimensions in a source document; (5) frequency of appearance of one or more of the source vector dimensions; (6) time or date information associated with the source vector; (7) a location of the source vector in an associated source document; (8) an originating location of the source vector; (9) a location of an event described in a source document; (10) a location where a source document associated with the source vector is analyzed; and (11) a purpose for analyzing a source document associated with the source vector. Also, the assigned magnitudes for the target vector can be stored in an indexed memory.

In another aspect, resolving multiple magnitudes assigned to a target vector includes receiving a target vector. Also, a total number of dimensions associated with the received target vector is determined. One of the target vector dimensions is processed to determine a total number of magnitudes assigned to the processed target vector dimension. In addition, a source vector is received, and a total number of dimensions associated with the received source vector is determined. One of the source vector dimensions is processed to determine a total number of magnitudes assigned to the processed source vector dimension. One of the assigned magnitudes for the processed target vector dimension is selected based on the determined total number of magnitudes assigned to the processed source vector dimension.

Implementations can optionally include one or more of the following features. The target vector can be compared with the source vector to obtain a similarity measure. Selecting one of the assigned magnitudes can include selecting a highest magnitude assigned when detected that the total number of magnitudes assigned to the processed source vector dimension exceeds one and detected that the processed source vector dimension is also present in the target vector. Alternatively, selecting one of the assigned magnitudes can include selecting a lowest magnitude assigned when detected that the total number of magnitudes assigned to the processed source vector dimension exceeds one and detected that the processed source vector dimension is not present in the target vector. Further, the assigned magnitudes for the target vector can be stored in an indexed memory. Also, selecting one of the assigned magnitudes can include when detected that the total number of magnitudes assigned to the processed source vector dimension equals one, selecting the one assigned magnitude. In addition, selecting one of the assigned magnitudes can include when detected that the total number of magnitudes assigned to the processed source vector dimension equals zero, assigning a default magnitude to the processed source vector dimension and selecting the assigned default magnitude.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this, specification.

In addition, the subject matter described in this specification can also be implemented as a system including a processor and a memory coupled to the processor. The memory may encode one or more programs that cause the processor to perform one or more of the method acts described in this specification. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
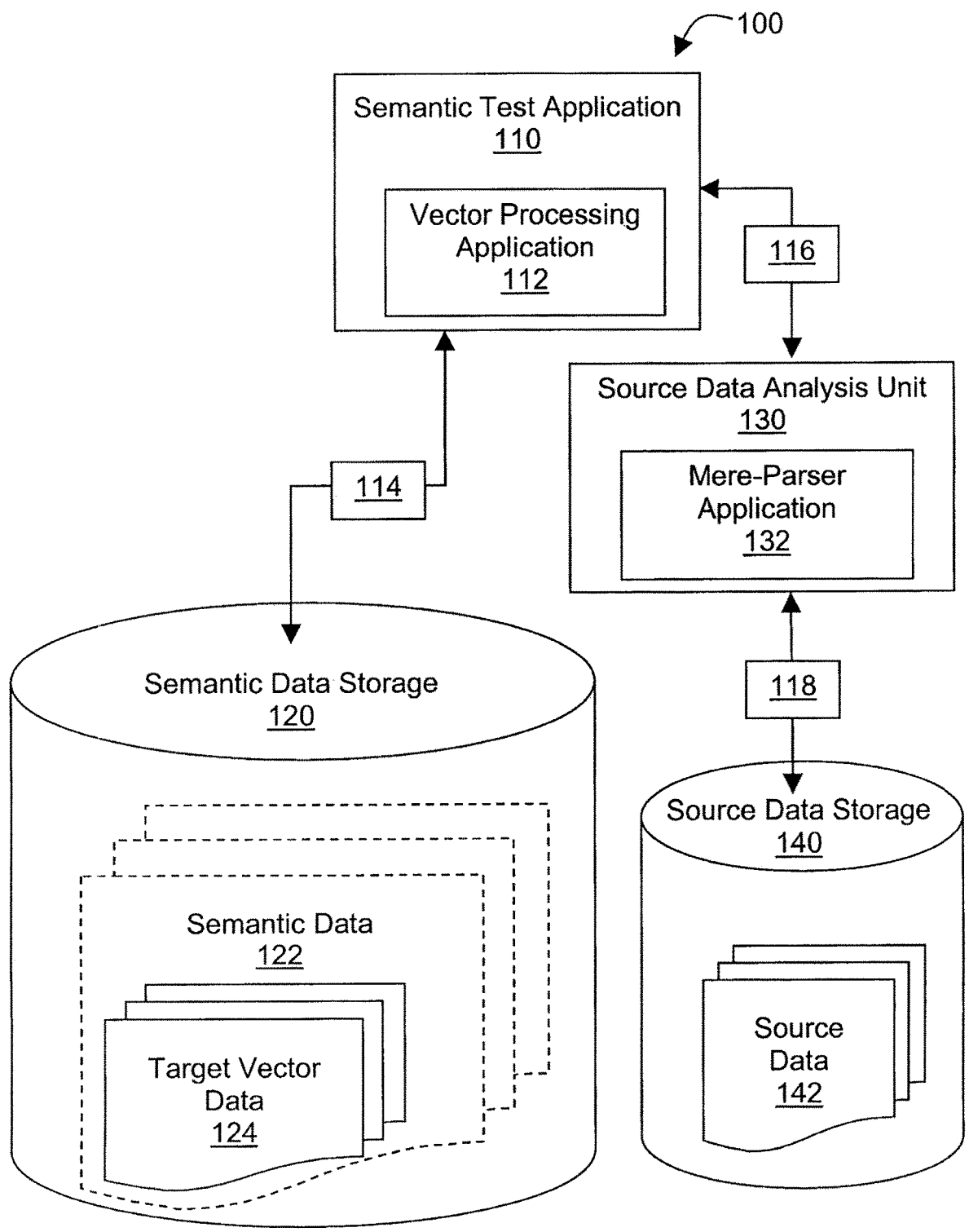
FIG. 1A is a functional block diagram of a multi-magnitudinal vector system.

Techniques are disclosed for implementing a multi-magnitudinal vector system. The techniques can be implemented to apply to any vector comparison method in which there are discernible features of source vectors that can be used to guide a process of resolving a magnitude for a multi-magnitudinal target vector.

Multi-magnitudinal vector construction is performed by assigning one or more magnitudes (weights) to each dimension (term or feature) in the target vector set. Target vectors represent the targeted set of knowledge or classifications, which are created prior to analysis of the source data. The target vectors are labeled (codified, or in some manner uniquely identified) and reside in some repository such as a knowledge base. Source vectors are vectors that are created from the source data being analyzed by some means specific to the style or form of the data.

When a vector comparison is performed between a single-magnitude source vector and a multi-magnitudinal target vector, each target vector dimension that has greater than one possible magnitude is resolved to a single magnitude based on some feature(s) of the source vector. This could also be resolved by the context of the vector comparison. In particular, if the target vector dimension has more than one possible magnitude and appears also in the source vector, the highest of the possible magnitudes is selected, otherwise the lowest is selected. It would also be possible to invert the selection or to use some other source vector feature(s), for instance frequency, to select one of several possible target vector dimension magnitudes.

The techniques disclosed in this specification provide the ability to select one of a multiplicity of target vector dimension magnitudes at comparison time based on some feature(s) of the source vector or context of the vector comparison operation against which the comparison is being performed. In some implementations The number of possible magnitudes and the number and type of features that determine the magnitude selection are application dependent. Further, dimensions that receive multiple magnitudes are selected on the basis of optional necessity, where a dimension is so designated if its use in defining a vector is optional, but if used, must be heavily weighted to avoid mismatches with target vectors in which it does not appear.

Various implementations of a knowledge-vector, a specialized type or class of term vector that uses a semantically based scheme of three possible weight categories, high/medium/low, that are assigned based on the semantic qualities of the terms rather than on the basis of frequency and proximity are described in U.S. Pat. No. 6,915,254 ("Automatically Assigning Medical Codes Using Natural Language Processing"), which is incorporated by reference in its entirety. Building upon the techniques described in the U.S. Pat. No. 6,915,254, a concept of multi-magnitudinal vector is described. A multi-magnitudinal vector is a target vector in which each term (where a term represents a dimension of the vector) in the target vector is assigned one or more potential weights (where a weight is the magnitude of the term/dimension). The actual weight from the assigned one or more potential weights is determined/resolved by vector comparisons based on one or more features of a source vector. Source vectors are vectors created by a parser from one or more source documents. Target vectors are vectors stored in a knowledge base. As such, multi-magnitudinal vectors can be implemented to identify segments of free-text in a Natural Language Processing (NLP) based information extraction system. However, implementations of the multi-magnitudinal vector as described in this specification is applicable to a broad category of vector comparison techniques including those with knowledge vectors. In the following, "dimension" and "magnitude" are interchangeably used in place of "term" and "weight" respectively without prejudice.

In some implementations, multi-magnitudinal vectors may be used to establish the semantic correctness of a potential parse of a sentence, for example, as applied in the parsing methods described in U.S. Pat. No. 6,915,254 and in U.S. patent application Ser. No. 11/735,278, now U.S. Pat. No. 7,908,552 entitled, "Mere-Parsing with Boundary and Semantic Driven Scoping," which are incorporated by reference in their entirety. In some implementations, the multi-magnitudinal vector system, as described in this specification, and the "mere-parsing" system, as described in the copending application, are operationally inter-related.

Multi-Magnitudinal System

FIG. 1A is a functional block diagram of a multi-magnitudinal vector system 100. The multi-magnitudinal vector system 100 includes a vector processing application 112. The vector processing application 112 can be implemented as a part of a semantic test application 110. The semantic test application 110 and/or the vector processing application 112 are communicatively coupled to a semantic data storage 120 through a bi-directional communication link 114. The semantic data storage 120 stores semantic data 122, which further includes target vector data 124. The bi-directional communication link 114 allows the vector processing application 112 and/or the semantic test application 110 to access the target vector data 124. In addition, the vector processing application 112 and/or the semantic test application 110 are communicatively linked to a source data analysis unit 130 through a bi-directional communication link 116. The source data analysis unit 130 includes a mere-parser application 132, and both are implemented as part of a Mere-Parsing system described in U.S. patent application Ser. No. 11/735, 278, now U.S. Pat. No. 7,908,552 entitled, "Mere-Parsing with Boundary and Semantic Driven Scoping." The source data analysis unit 130 and/or the mere parser application 132 are communicatively linked to a source data storage 140. The source data storage 140 is implemented to store source data 142.

Figure 1B:
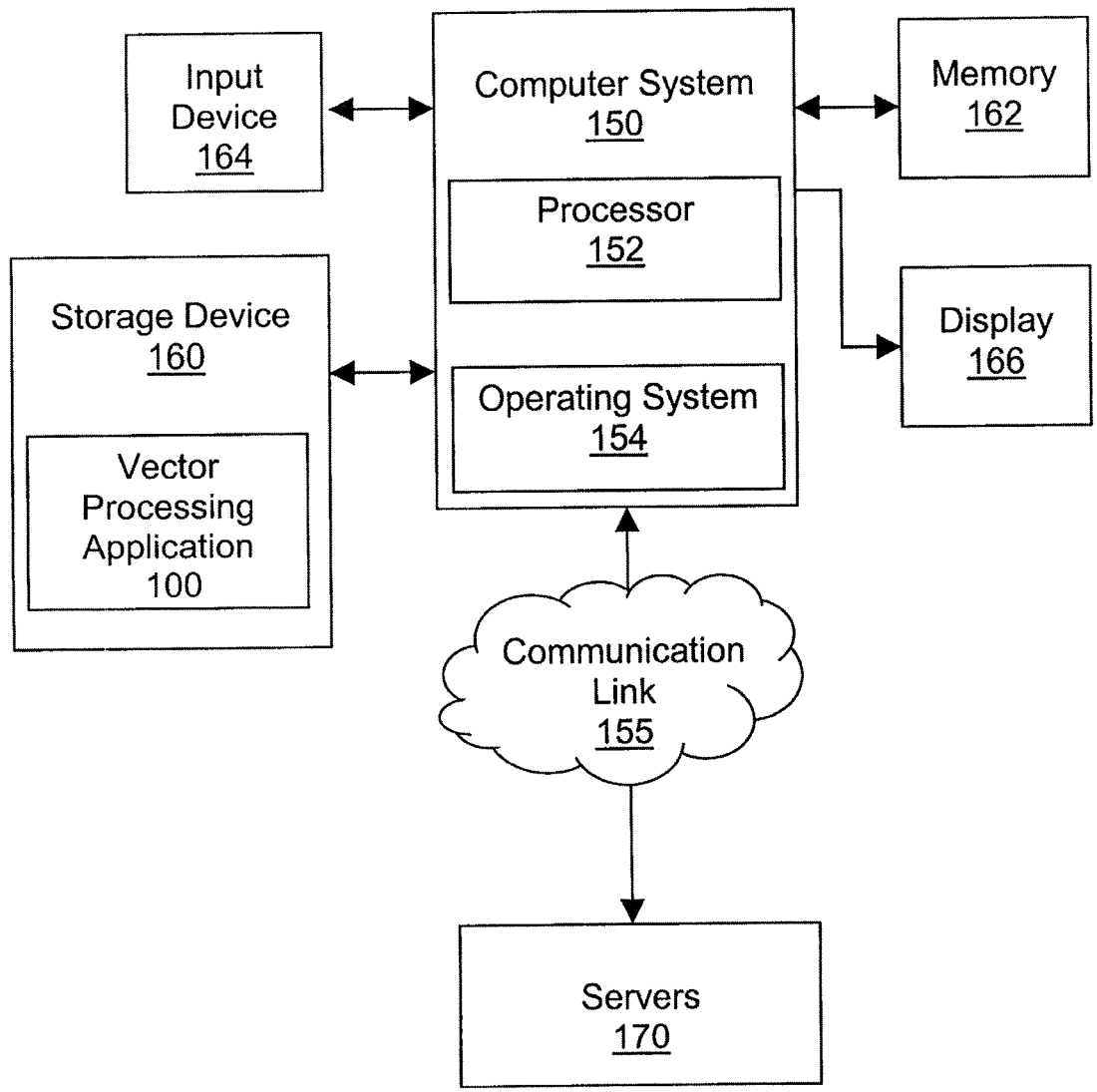
FIG. 1B is a functional block diagram of a multi-magnitudinal vector system executing on a computer system.

FIG. 1B is a block diagram of the multi-magnitudinal vector system 100 implemented as software or a set of machine executable instructions executing on a data processing apparatus or a computer system 150 such as a local server in communication with other internal and/or external computers or servers 170 through a communication link 155, such as a local network or the internet. The communication link 155 can include a wired or wireless network communication protocol. A wired network communication protocol can include local wide area network (WAN), broadband network connection such as Cable Modem, Digital Subscriber Line (DSL), and other suitable wired connections. A wireless network communication protocol can include WiFi, WIMAX, BlueTooth and other suitable wireless connections.

The computer system 150 can include a central processing unit (CPU) 152 executing a suitable operating system 154 (e.g., Windows® OS, Apple® OS, UNIX. LINUX, etc.), a storage device 160 and a memory device 162. The computer system can optionally include other peripheral devices, such as an input device 164 and a display device 166. The storage device 160 can include nonvolatile memory units such as a read only memory (ROM), a CD-ROM, a programmable ROM (PROM), erasable program ROM (EPROM), and a hard drive. The memory device 162 can include volatile memory units such as random access memory (RAM), dynamic random access memory (DRAM), and synchronous DRAM (SDRAM). A display device 166 can include a Cathode-Ray Tube (CRT) monitor, a liquid-crystal display (LCD) monitor, or other suitable display devices. Other suitable computer components such as input/output devices can be included in the computer system 150.

In some implementations, the multi-magnitudinal vector system 100 is implemented entirely as a web application (not shown) maintained on a network server (not shown) such as a web server. The multi-magnitudinal vector system 100 can be implemented as other suitable web/network-based applications using any suitable web/network-based computer languages. For example C/C++, an Active Server Page (ASP), and a JAVA Applet can be implemented. When implemented as a web application, multiple end users are able to simultaneously access and interface with the multi-magnitudinal system 100 without having to maintain individual copies on each end user computer. In some implementations, the multi-magnitudinal vector system 100 is implemented as local applications executing in a local computer or as client-server modules, either of which may be implemented in any suitable programming language, environment or as a hardware device with the method's logic implicit in the logic circuit design or stored in memory such as PROM, EPROM, Flash, etc.

Term Weight Storage and Processing

Figure 1C:
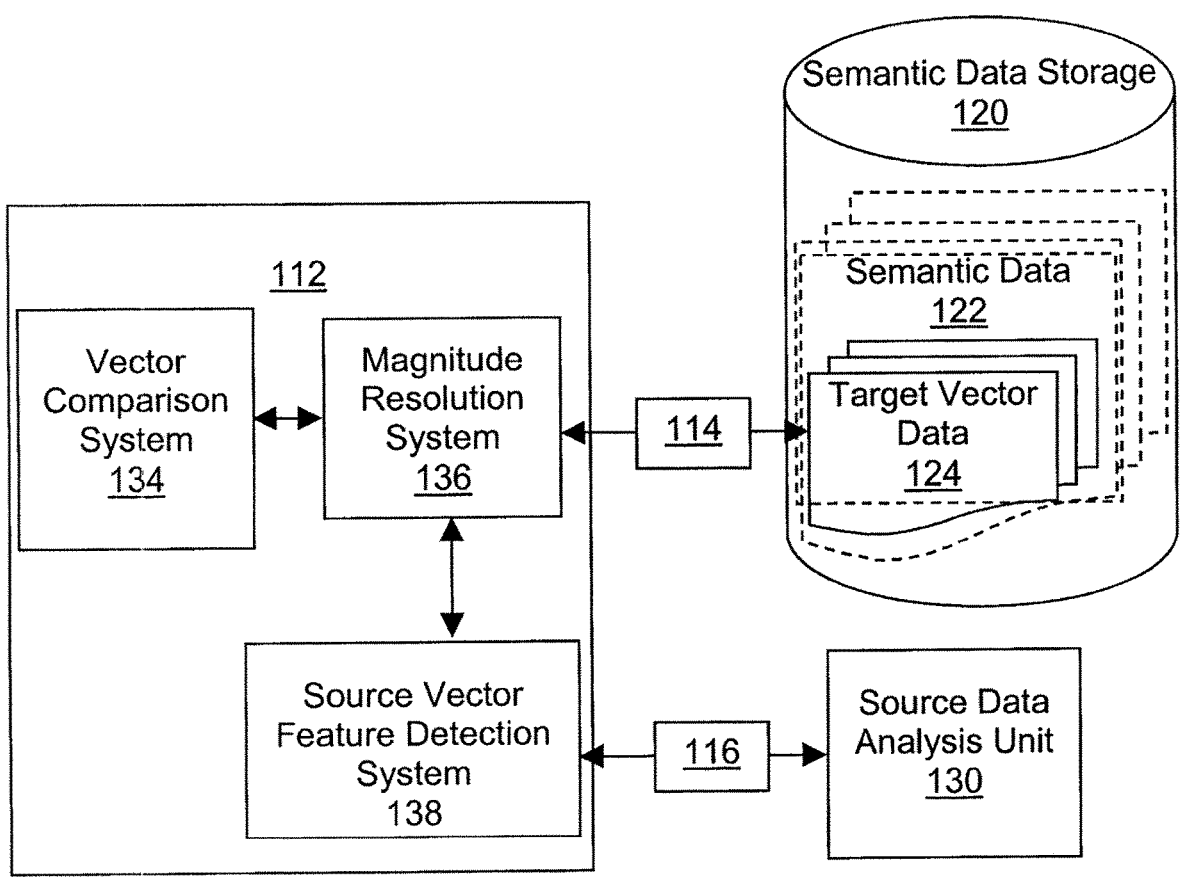
FIG. 1C is a functional block diagram of a vector processing application.

FIG. 1C is a detailed view of the vector processing application 112, which includes a vector comparison system 134, a magnitude resolution system 136 and a source vector feature detection system 138. The vector processing application 112 interacts with the source data analysis unit 130 and the semantic data storage 120 through the bi-directional communication links 116 and 114 respectively. The vector processing application 112 is further described in U.S. Pat. No. 6,915,254.

The vector comparison system 134 functions to implement the vector difference comparison as described in U.S. Pat. No. 6,915,254. (See, e.g., U.S. Pat. No. 6,915,254 at column 21, lines 8-31.) Vector difference is quantified by measuring the angle between two vectors. The smaller the angle, the more words in common between the two vectors. Orthogonal vectors share no common words. The angle (.theta.) between two vectors may be calculated using equation (1) shown below. The subscripts in equation (1) denote different dimensions. In this calculation, each unique word in a vector is a different dimension. The vectors X and Y shown below have two common dimensions, hence two common words. The order of the words in a parse item or vector definition has no effect on the vector difference calculation.

$$\text{Vector } X: x_1, x_2$$
$$\text{Vector } Y: y_1, y_2, y_3$$
$$\theta = \cos^{-1}\left(\frac{(x_1 y_1 + x_2 y_2)}{\left(\sqrt{x_1^2 + x_2^2} \cdot \sqrt{y_1^2 + y_2^2 + y_3^2}\right)}\right) \quad \text{Equation (1)}$$

The target vector data 124 functions to store a list of possible magnitudes that may be resolved by the magnitude resolution system 136. The resolved magnitude is used by the vector comparison system 134. The target vector data 124 includes a set of indexed data structures, one for each of the possible magnitudes with entries for each dimension that occurs in any of the target vectors. Other methods for storage of the magnitude data are possible, such as storing the magnitude data as a local list with each vector. Dimensions may have multiple magnitudes assigned, where each of the multiple assigned magnitudes are indicated in the target vector data 124.

The source vector feature detection system 138 and the vector comparison system 134 communicate with the source data analysis unit 130 through the communication link 116 to receive source data vectors included in the source data 142, which can be stored in the source data storage 140. In response to the communication (e.g., request for data) with the source vector feature detection system 138 and/or the vector comparison system 134, the source data analysis unit 130 communicates with the source data storage 140 through the communication link 118 to access the requested data (e.g., source data vectors) and forwards the accessed data to the vector comparison system 134 and/or the source vector feature detection system 138. The source vector feature detection system 138 produces a set of features from the received source data vectors, which is used to interact with the magnitude resolution system 136. The magnitude resolution system accesses the semantic data storage 120 through the communication link 114 to access the target vector data 124 and select one or more target vectors. The produced set of features received from the source vector feature detection system 138 are used by the magnitude resolution system to select the appropriate magnitude for each dimension of each target vector selected from the target vector data 124. The selected target vectors and the source data vectors are forwarded to the vector comparison system 134 to perform comparisons. The components of the vector processing application 112 may provide feedback to the source data analysis unit 130 to provide guidance in the formation of source data vectors as described in U.S. patent application Ser. No. 11/735,278, now U.S. Pat. No. 7,908,552 entitled, "Mere-Parsing with Boundary and Semantic Driven Scoping." Automated learning algorithms may also be implemented in the vector processing application 112 such that the target vector data 124 may be modified.

In some implementations, multi-magnitudinal weights need not be assigned. However, absence of multi-magnitudinal weighting may exponentially increase the total number of vectors created, stored and managed. In addition, lack of multi-magnitudinal weighting may increase the complexity of the process for storing magnitudes by designating magnitudes as vector specific rather than universal. For example, in the field of medical definitions, the semantic core terms (dimensions) for a definition can frequently be accompanied by a very high number of optional defining terms, but terms that are optional for some medical definitions may be core for others. The effect is that duplication of the effect of the multi-magnitudinal vector system 100 as described in this specification may require a vector set that increases according to x.sup.N (x to the power N) where x is the number of possible magnitudes per dimension and N is the number of optionally necessary dimensions in the multi-magnitudinal vector. In medical vocabulary systems, it is not uncommon for a defined concept to have as many as 20 or more optionally necessary terms so that the expansion of a single multi-magnitudinal vector would require 2.sup.20 standard vectors to represent.

The multi-magnitudinal system 100 can also facilitate the implementation of linear attribute propagation and tree building as described in the copending U.S. patent application entitled, "Mere-Parsing with Boundary and Semantic Driven Scoping." Laterality descriptors (e.g., left, right, bilateral) are generally treated as attributes because most anatomical sites that can be described by "left" and "right" are "bilateral" and a disease or medical condition (e.g., a fracture) of say a right foot is not medically distinct from the same condition in the left foot. For these conditions, laterality is treated as an attribute, and the laterality terms may need to be low weight. However, if the left and right anatomical sites are distinctively different in terms of medical function, then laterality may become core knowledge and as such an intrinsic part of the definition of a medical condition that affects such a site (e.g., "left ventricle atrophy" vs. "right ventricle atrophy.") In this case, the laterality terms are core knowledge and are assigned a high weight. By entering "left" and "right" as both high and low weights and defining conditions such as "left ventricle atrophy" and "right ventricle atrophy" with target vectors that include the terms left and right, but defining "foot fracture" without the terms "left" and "right," the multi-magnitudinal vector system 100 achieves the desired result when using the vector dimensional magnitude resolution process as described with respect to FIG. 2A-B. Other terms that may receive both high and low weights in a medical application of the multi-magnitudinal vector system 100 can include "lobar", "quadrant", "distal", "medial" etc., all of which may be necessary in some definitions but optional in others.

Vector Dimensional Magnitude Resolution

Figure 2A:
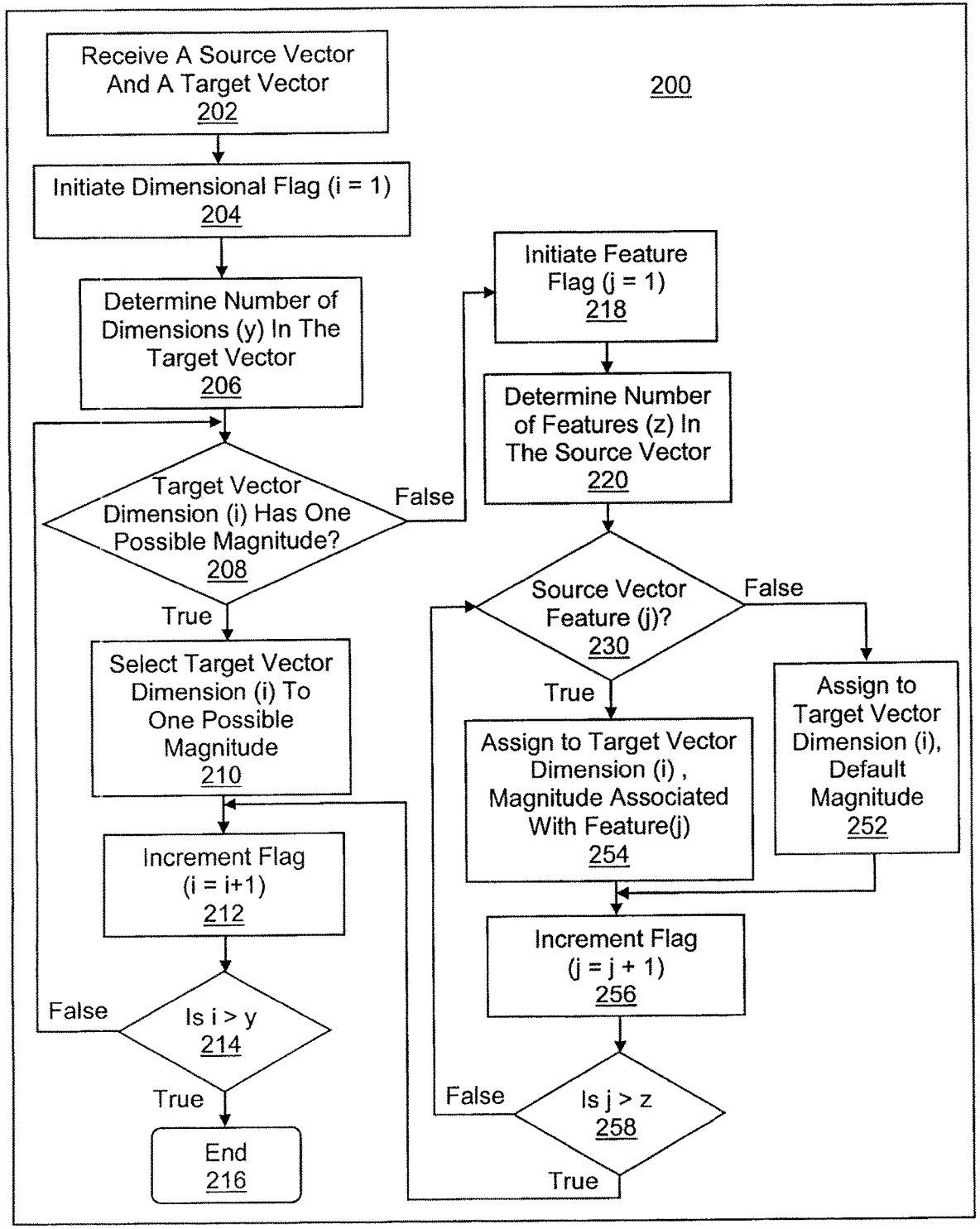
FIG. 2A is a flow chart of a process for resolving a magnitude for each vector dimension in a multi-magnitudinal vector system.

FIG. 2A is a flow chart describing a process 200 for selecting a particular dimensional magnitude using the magnitude resolution system 136. A source vector is received from the source data 142 stored in the source data storage 140 and a target vector is received from the target vector data 124 stored in the semantic data storage 120 and compared by the vector comparison system 134 (e.g., using the process described in U.S. Pat. No. 6,915,254). From the one or more magnitudes assigned to each dimension of the target vector, a particular magnitude is selected or resolved for each dimension by the magnitude resolution system 136. The process 200 iterates through each of the dimensions (terms) in the target vector to resolve a particular magnitude for each dimension. At 202, a source vector and a target vector are received from the source data 142 stored in the source data storage 140 and the target vector data 124 stored in the semantic data storage 120 respectively. At 204, a variable, "i," (e.g., a flag to determine when to stop an iterative process) is initiated (i=1) to control and track the dimensions of the target vector in the iterative process 200. The total number of dimensions (y) present in the target vector is determined at 206. A decision is made at 208 to determine whether a dimension (i) of the target vector has a single possible magnitude assigned. If the determination at 208 is true, then the single associated magnitude is selected as the magnitude for the dimension (i) at 210. The variable (i) is incremented (i=i+1) at 212 to keep track of the target vector dimensions. A decision is made at 214 to determine whether the dimension (i) is the last dimension (i.e., all of the dimensions for the target vector has been processed) for the target vector (is i>y?). If the determination at 214 is true, then the iterative process 200 ends at 216. Otherwise, the next dimension (i) for the target vector is processed at 208.

However, if the determination at 208 is false (i.e., there are more than one possible magnitudes assigned to the target vector dimension (i)), then the iterative process 200 continues at 218 to initiate a variable (j=1) to keep track of the iteration through the feature set. At 220, the total number of features (z) in the source vector is determined. A decision is made at 230 to determine whether a test for a source vector feature (j) evaluates to true. For example, a determination is made whether a term that defines a target vector dimension is also present in the source vector under comparison (i.e., to obtain a similarity measure.) If the determination at 230 is true, then a magnitude associated with that feature (j) of the source vector is selected and assigned to the target vector dimension (i) at 254. There are various features of the source vector that can serve as criteria for selecting a particular magnitude for the target vector dimension (i) as shown in FIG. 2B.

Figure 2B:
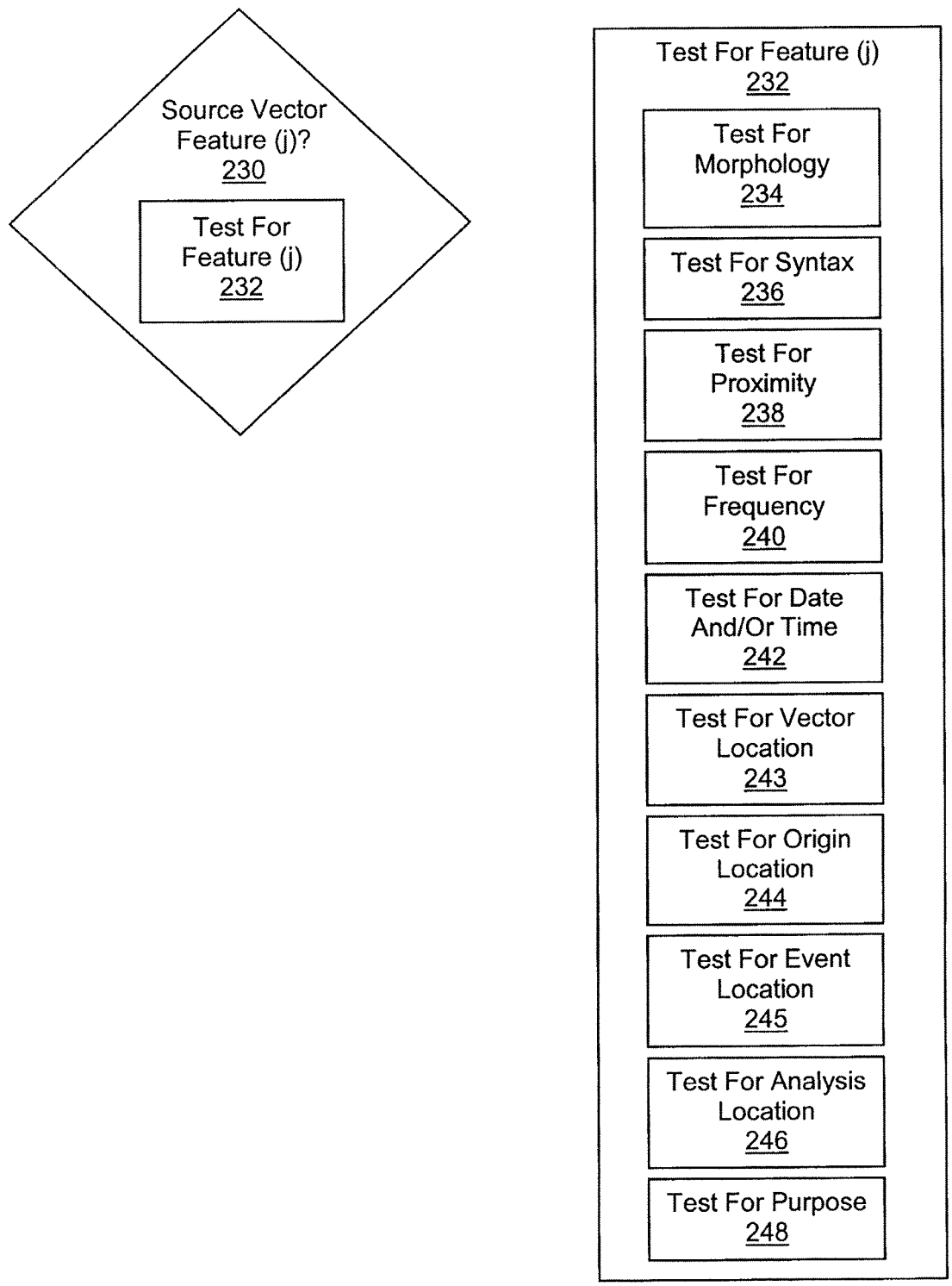
FIG. 2B is a flow chart of a process for testing a source vector feature.

FIG. 2B is a flow chart showing a detailed view of the test for the source vector feature (i) 230. At 232, one or more of the following features of the source vector can be tested. The test at 234, is a test for morphology or the morphological characteristics of the term(s) under consideration. One of any number of multiple magnitudes for a target vector dimension can be selected based on the part of speech (morphology) of one or more terms in the source vector. For example, a high magnitude (or weight) is selected if a term of the source vector (e.g., "pierced") under consideration is a verb (as in "pierced the heart"), but a low magnitude is selected if the term (e.g., "piercing") under consideration is an adjective (as in armor "piercing bullet").

The test at 236 is a test for syntax (i.e., syntactic characteristics of the term(s) under consideration.) One of any number of multiple magnitudes for a target vector dimension can be selected based on the grammatical function (syntax) of one or more terms or phrases in the source vector. For example, a high magnitude is selected if a term of the source vector (e.g., "bullet") under consideration is the subject of an active verb (as in "the bullet pierced the heart"), but a low magnitude is selected if the term (e.g., "bullet") under consideration is the subject of a passive verb (as in "the bullet was pierced to increase its lethality").

The test at 238 is a test for proximity (i.e., the proximity of the terms under consideration.) One of any number of multiple magnitudes for a target vector dimension can be selected based on the proximity of one term or phrase in a source vector's source text to any one or more other terms or phrases in either the same source vector's source text or the source text of the entire document from which the source vector is derived. For example, a high magnitude is selected if the term under consideration is within N words of a related term. In the following, "views: AP, lateral and frogleg," the term "frogleg" (which is a type of x-ray view) is a single term vector that appears within N words of the term "views." However, a low magnitude is selected in the absence of such proximity. In the following source vector, "the patient became ill after eating undercooked froglegs," the term "froglegs" is not in proximity to an associated term, and thus "froglegs" in this instance is not considered as a type of x-ray view.

The test at 240 is a test for frequency (i.e., frequency of appearance of the terms under consideration.) One of any number of multiple magnitudes for a target vector dimension can be selected based on the frequency of one or more terms or phrase in a source vector's source text or the source text of the entire document from which the source vector is derived. A frequency threshold can be implemented to determine when to select a high magnitude and alternatively a low magnitude. For example, a high magnitude is selected if a term or phrase X appears in a document N or more times, and a low magnitude is selected when the X appears less than the threshold N. The frequency of X can be subjected to as many threshold values as are needed for the number of possible magnitudes in the target vector.

The test at 242 is a test for date and/or time. One of any number of multiple magnitudes for a target vector dimension can be selected based on the date and/or time information presented in a source vector's source text or the source text of the entire document from which the source vector is derived. For example, a high weight is applied if the date and/or time information in or associated with the source vector defines an incident/encounter that occurred within a particular time span. In medical applications, various time-dependent issues can arise, which can affect characterization of certain medical procedures depending on the time of day. For example, emergency physicians may always report the results of an x-ray of a patient, but the timing of the report can vary. If the x-ray results are reported during "normal business hours" when a radiologist is on site, the emergency physicians may not be able to bill for the x-ray interpretation. Whereas, if the x-ray results are reported at night when no radiologist is on site, the emergency physicians may be able to bill for the interpretation.

The test at 243 is a test for location of the source vector within the source document. One of any number of multiple magnitudes for a target vector dimension can be selected based on the location of the source vector within the source document (e.g., what section of the source document). For example, a high weight is applied if the information (e.g., "improves with rest") is located in the history section, but a low weight is applied if the same information is located in the follow-up section. The distinguishing characteristics or rules include determining whether the number of aspects of the patient's medical history documented by the doctor (e.g., changes in a condition such as "improved", "worse", "same," etc.) are actually part of the patient's medical history as related to the doctor by the patient himself.

The test at 244 is a test for origination location of the source document under analysis. One of any number of multiple magnitudes for a target vector dimension can be selected based on the origination location of the source document containing the source vector (e.g., some particular department of a hospital). For example, if a physician describes the analysis of an x-ray in an emergency department setting, certain source document claims (terms or phrases) are required as indicators that the physician "read" the x-ray him/herself and can therefore bill for the procedure. In this case the specified claim terms would be high weight, but if the physician was a radiologist working in the radiology department, it is assumed that the radiologist making the report (source document) is the one who "read" the x-ray, and so the claim terms in question would be low weight.

The test at 245 is a test for event location of the event related to or described in the source vector analysis. One of any number of multiple magnitudes for a target vector dimension can be selected based on the event location related to or described in the source vector. For example, for billing purposes, administration of medication in a patient's home is treated differently than administration the same medication in the physician's office. In home medication is given a low weight for certain billing purposes, while medical office administration of the same medication is given a high weight.

The test at 246 is a test for source document analysis location. One of any number of multiple magnitudes for a target vector dimension can be selected based on the location in which the source document and its source vectors are being analyzed, such as the location where certain reports of medical services or events are analyzed. In medical applications, analysis of certain reported events potentially can be significant depending on the purpose of analysis (which can often equate to the location where the analysis is performed.) For example, if an emergency medicine report is analyzed by a hospital, certain aspects that relate to facility charges (materials and services charged by the hospital facility) are important (high weight). However, if the same report is analyzed by a physician's billing entity, the terminology relating to facility charges is low weight, but the aspects related to professional services are important (high weight).

The test at 248 is a test for the purpose for which the analysis is taking place (e.g., coding for billing, abstracting for the health record, etc.) One of any number of multiple magnitudes for a target vector dimension can be selected based on the purpose for which the analysis is taking place. For example, when analyzing medications for the purpose of abstracting for a health record, the dose, route and frequency (e.g., "400 mg orally four times a day") are important (high weight terms). However, when analyzing medications for the purpose of coding for professional fee medical billing, the does, route and frequency are not of consequence (low weight).

These tests 234, 236, 238, 240, 242, 243, 244, 245, 246 and 248 are applicable to term vectors, but can be modified to apply to other areas, such as signal analysis, image analysis, financial data, etc.

If the determination at 230 is false (i.e., one or more of the available tests 234, 236, 238, 240, 242, 243, 244, 245, 246 and 248 for feature applied fails), then the target vector dimension (i) is assigned to a default magnitude (e.g., moderate weight) at 252. For example, in medical coding, a default magnitude is the middle or moderate weight between high and low weights. All high weight terms should match between source and target vectors to achieve an acceptable match. In addition, while matches on low weight terms can improve the match between source and target vectors, mismatches on low weight terms normally cannot prevent a match between source and target vectors. Further, the default, middle or moderate weight matches can both improve the match between source and target vectors if the middle weight terms are present in both source and target vectors, but if a sufficient number (e.g., a predetermined number) of moderately weighed terms are mismatched (i.e. if some number, the number being dependent on the number of total dimensions in the vectors and the distribution of high, moderate and low weight terms, of moderate weight terms appear in either the source or target vector, but not in the other), then a match can be prevented. At 256, the feature tracking variable (j) is incremented. A decision is made at 258 to determine whether the last feature has been processed (is j>z?). If the determination at 258 is true, then the iterative process 200 continues at 212 as described above. Otherwise if the determination at 258 is false, then the next feature is processed at 230.

Figure 3:
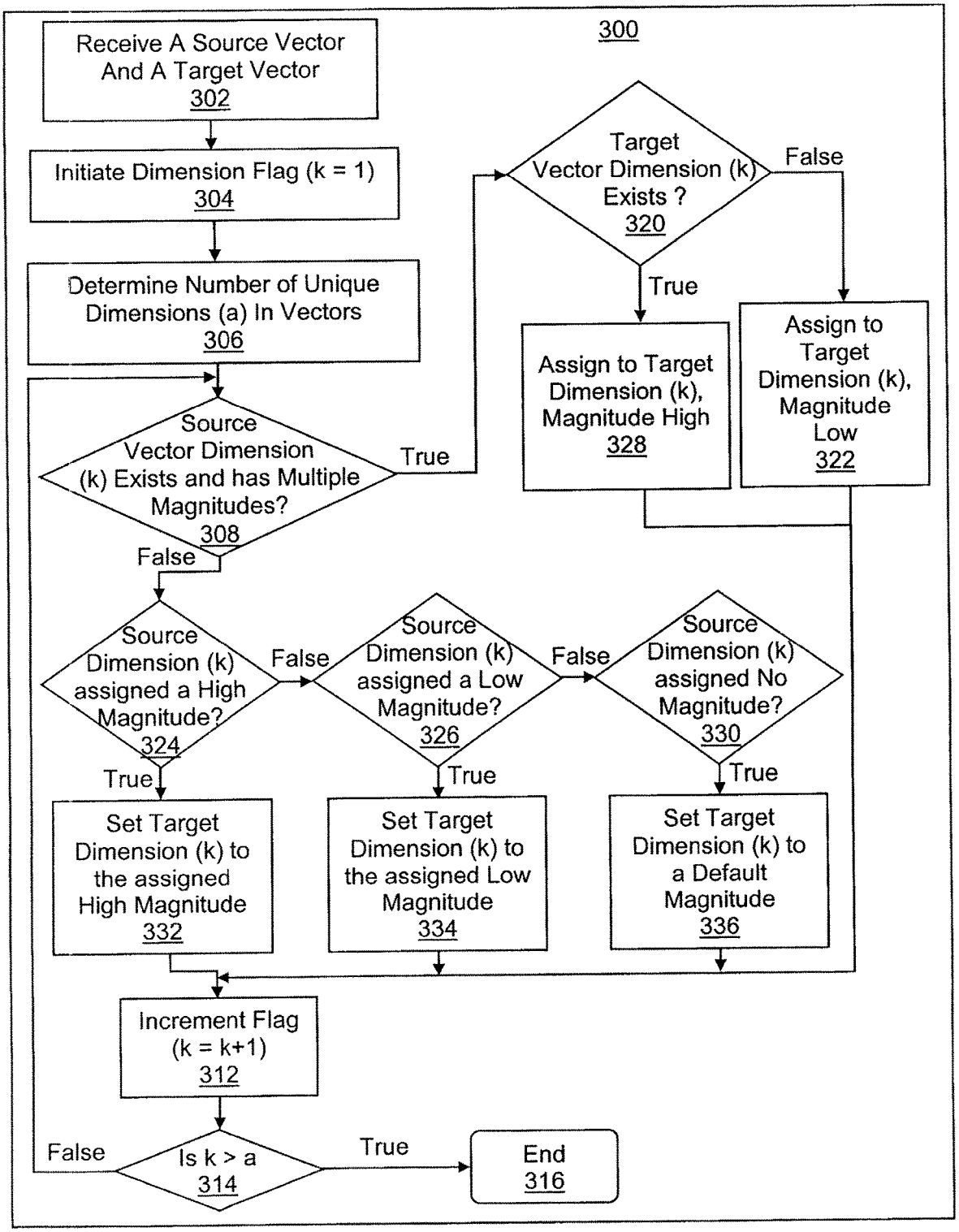
FIG. 3 is a flow chart of a process for detecting and setting a source vector feature in a multi-magnitudinal vector system.

In some implementations, an iterative process can be implemented to assign one of the available magnitudes (e.g., low, moderate, high) to each identified dimensions of a target vector. FIG. 3 is a flow chart of an iterative process 300 that analyzes the dimensions of a source vector. The process 300 tests whether a particular dimension occurs in both the source and target vectors being compared, as further described below. More complex algorithms may be used in some implementations in order to test for more complex source vector features.

The process 300 can be implemented as an alternate process of implementing the magnitude resolution system 136. As illustrated, the process 300 is designed to resolve the multiple magnitudes in a target vector dimension to a single magnitude for use in performing the comparison to a source vector. The process 300, as illustrated, compares a target vector having dimensions with the possibility of two selectable magnitudes (e.g., high and low) or a default magnitude (e.g., moderate) with a source vector. At 302, a target vector is received from the target vector data 124 stored in the semantic data storage 120. Also, a source vector is received from the source data 142 stored in the source data storage 140 by communicating with the source data analysis unit 130. At 304, a variable (e.g., a flag to determine when to stop an iterative process) is initiated (k=1) to keep track of each unique dimension that occurs in the source vector and/or the target vector during the iterative process 300. The total number of unique dimensions (a) for the source and target vectors is determined at 306.

A decision is made at 308 to determine whether a dimension (k) exists in the source vector and has multiple magnitudes. If the determination at 308 is true, then a decision is made at 320 to determine if dimension (k) also exists in the target vector. When the determination at 320 is true, then the magnitude for the target vector dimension (k) is set to the high magnitude. When the determination at 320 is false, then the magnitude for the target vector dimension (k) is set to the low magnitude. In either case, the process continues at 312. When the determination at 308 is false, then the source vector dimension (k) is determined to have a single magnitude or no magnitude assigned. The processing 300 continues at 324, where the magnitude for the source vector dimension (k) is analyzed to determine whether a single high magnitude is assigned. When a single high magnitude is determined to be assigned to the source vector dimension (k) at 324, the assigned high magnitude is set as the magnitude for the target vector dimension (k) at 332. When the source vector dimension (k) is determined to be assigned to a single low magnitude at 326, the assigned low magnitude is set as the magnitude for the target vector dimension at 334. Further, when no magnitude is determined to be assigned to the source vector dimension (k) at 330, a default magnitude is set as the magnitude for the target vector dimension at 336 and the process 300 continues at 312.

At 312, flag k is incremented by 1, and the process continues at 314 where a decision is made as to whether k is greater than a (i.e., is dimension k the last dimension in the target vector?). If the determination at 314 is false, then more dimensions still remain to have a magnitude assigned, and thus the iterative process 300 continues at 308. If the determination at 314 is true (i.e., no other dimensions remain), then the process 300 ends at 316.

Once a magnitude has been assigned to each dimension in both the source and target vectors, as illustrated in 200 or 300, the source and target vectors can be compared. A comparison algorithm can be designed so that a perfect match yields a score of "1" and a comparison with no like terms between the source and target vectors yields a score of "0." Although the process 300 in FIG. 3 describes an implementation with three possible magnitudes maximum per dimension, other implementations can include various numbers of maximum magnitudes based on the desired application, precision, etc. The presence or absence of a corresponding dimension in the source vector for each multi-magnitudinal dimension in the target vector is the feature that selects either the higher (presence) or the lower (absence) magnitude. In instances where a dimension occurs in the source vector but not in the target vector, a default (e.g., moderate) magnitude is assigned. Alternatively, for dimensions that do not have multiple (high/low) magnitudes, the default (moderate) magnitude is also assigned.

Computer Implementations

In some implementations, the techniques for implementing multi-magnitudinal vectors as described in FIGS. 1A and 1B can be implemented using one or more computer programs comprising computer executable code stored on a computer readable medium and executing on the multi-magnitudinal vector system 100. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device.

In some implementations, the computer executable code may include multiple portions or modules, with each portion designed to perform a specific function described in connection with FIGS. 1A and 1B above. In some implementations, the techniques may be implemented using hardware such as a microprocessor, a microcontroller, an embedded microcontroller with internal memory, or an erasable programmable read only memory (EPROM) encoding computer executable instructions for performing the techniques described in connection with FIGS. 1A and 1B. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., E-PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems and techniques described here can be implemented on a computer having a display device (e.g., a CRF (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A number of embodiments have been described. Nevertheless, it will be understood that various modifications may be made without departing from the scope of the following claims. Accordingly, other embodiments are within the scope of the following claims. For example, in some implementations, more than a maximum of three magnitudes for each dimension can be used. Also, alternate vector comparison methods or other source vector features can be implemented. Further, the particular range of magnitudes, the set of source vector features, and the objective function of the vector comparison method can vary based on the application at hand. In addition, in the present specification, while the magnitude scale and the vector comparison function are monotone, the magnitudes are discrete and the vector comparison function is continuous.

What is claimed is:

1. A non-transitory computer readable medium encoded with instructions executable by a processor of a computing system for performing vector comparison in natural language processing, the instructions comprising instructions for:
    receiving a target vector and a source vector, the target vector including a first target vector dimension comprising a first word or phrase and a second target vector dimension comprising a second word or phrase;
    assigning a first magnitude comprising a first weight to the first target vector dimension based on a first feature associated with the source vector;
    assigning a second magnitude comprising a second weight to the second target vector dimension based on a second feature associated with the source vector;
    determining a total number of dimensions present in the target vector; and
    determining whether a current dimension of the target vector is a last dimension to be processed.

2. The non-transitory computer readable medium of claim 1, wherein the instructions further comprise instructions for:
    comparing the target vector with the source vector to obtain a similarity measure by measuring an angle between the target vector and the source vector.

3. The non-transitory computer readable medium of claim 1, wherein the instructions further comprise instructions for:
    storing the source vector in a source data storage memory; and
    storing the target vector in a semantic data storage memory.

4. The non-transitory computer readable medium of claim 1, wherein the source vector is created by a parser from one or more source documents.

5. The non-transitory computer readable medium of claim 1, wherein the first feature or the second feature associated with the source vector comprises a morphological characteristic, a syntax, a proximity to one or more additional terms or phrases associated with the source vector, a frequency, a date or a time, a location, an origination location of a source document, an event location, a source document analysis location, or a purpose for which the vector comparison is occurring.

6. The non-transitory computer readable medium of claim 1, wherein assigning a low weight to the first or second magnitude cannot prevent a match between the target vector and the source vector.

7. The non-transitory computer readable medium of claim 1, wherein the instructions further comprise instructions for:
    determining whether a source vector dimension has more than one possible magnitude, wherein the magnitude comprises a weight.

8. A system for performing vector comparison in natural language processing, the system comprising at least one processing unit coupled to a memory, wherein the memory is encoded with computer executable instructions that, when executed, cause the at least one processing unit to:
    receive a target vector and a source vector, the target vector including a first target vector dimension comprising a first word or phrase and a second target vector dimension comprising a second word or phrase;
    assign a first magnitude comprising a first weight to the first target vector dimension based on a first feature associated with the source vector;
    assign a second magnitude comprising a second weight to the second target vector dimension based on a second feature associated with the source vector;
    determine a total number of dimensions present in the target vector; and
    determine whether a current dimension of the target vector is a last dimension to be processed.

9. The system of claim 8, wherein the instructions further cause the at least one processing unit to:
    compare the target vector with the source vector to obtain a similarity measure by measuring an angle between the target vector and the source vector.

10. The system of claim 9, wherein an order of the first word or phrase and an order of the second word for phrase do not impact the similarity measure.

11. The system of claim 8, wherein the memory comprises:
    a source data storage memory configured to store the source vector; and
    a semantic data storage memory configured to store the target vector.

12. The system of claim 8, wherein the source vector is created by a parser from one or more source documents.

13. The system of claim 8, wherein the first feature or the second feature associated with the source vector comprises a morphological characteristic, a syntax, a proximity to one or more additional terms or phrases associated with the source vector, a frequency, a date or a time, a location, an origination location of a source document, an event location, a source document analysis location, or a purpose for which the vector comparison is occurring.

14. The system of claim 8, wherein the instructions further cause the at least one processing unit to:
    if the first or second magnitude comprises a low weight, match the target vector to the source vector even if the first or second magnitude does not match the first or second feature associated with the source vector.

15. The system of claim 8, wherein the instructions further cause the at least one processing unit to:

determine whether a source vector dimension has more than one possible magnitude, wherein the magnitude comprises a weight.

16. The system of claim 8, wherein the first magnitude and the second magnitude are each associated with a respective indexed data structure.

* * * * *